UNITED STATES PATENT OFFICE.

MORTIMER I. STRAUSS, OF CLEVELAND, OHIO.

COATING COMPOSITION AND PROCESS OF MAKING THE SAME.

1,386,380.  Specification of Letters Patent.  Patented Aug. 2, 1921.

No Drawing.  Application filed May 18, 1917. Serial No. 169,451.

*To all whom it may concern:*

Be it known that I, MORTIMER I. STRAUSS, citizen of the United States, residing at Cleveland, in the county of Cuyahoga and State of Ohio, have invented certain new and useful Improvements in Coating Compositions and Processes of Making the Same, of which the following is a specification.

This invention relates to an improved composition of matter in the form of a varnish, surface coating, or cement, and to the process of making the same. More particularly the invention has relation to a composition of matter suitable for use in preventing loss or leakage of gasolene, kerosene, oils or the like, and for protecting the surfaces of containers or conduits in or through which they are stored or conducted.

Gasolene, kerosene, oils or the like are stored in receptacles which frequently require the use of packed or sealed joints, especially when the receptacle or tank is of knock-down construction. These materials are also conducted through pipes or conduits frequently required to be flexible and which therefore are made or lined with rubber or a composition, which also is used for the gaskets or packings of the tanks. These liquids exert a deleterious effect upon rubber or like materials or compositions, which are therefore peculiarly unsuitable for the purpose for which they must be used, and it is difficult to provide a satisfactory protecting material for rubber or like gasket materials. Ordinary shellac is to a certain extent impervious to or unaffected by gasolene, oils or the like, but shellac, when dry, is hard and brittle and therefore cracks and exposes the underlying material to the action of the gasolene or oils, and can not be used where flexibility is required. Moreover, it is not sufficiently adhesive, and will not cling to certain surfaces.

The object of the present invention is to provide a composition of matter which is wholly impervious to or unaffected by gasolene, kerosene, oils or the like; which when dry, is flexible and will bend without cracking and thereby maintains a continuous protecting surface; which is more adhesive to metal, wood, rubber, concrete, and other materials than ordinary shellac, and which can be used in several forms, for example, as a varnish or surface coating, or as a cement. Another object of the invention is to provide an improved method of making such composition of matter.

Recognizing the oil and gasolene proof qualities of shellac and similar gums, this material, to-wit, shellac or a shellac-like substance, forms the basis of my improved composition of matter, but the shellac is subjected to certain treatment to produce the improved qualities desired. Any ordinary grade or kind of shellac or similar substance may be used although I prefer to use what is called in the trade "orange shellac." This material is first dissolved in a suitable alkaline solution, for example, caustic soda, preferably in the presence of heat to promote solution. The mixture is carefully stirred until all of the shellac is dissolved. The product of this solution is not a definite composition as it depends upon the particular shellac or gum used, but as all shellac is a resinous gum, the product passing into solution is usually sodium resinate or a similar material. A waxy substance forms on the top of the solution and is skimmed off or otherwise removed. This waxy substance probably consists of impurities in the shellac, although it may contain a slight quantity of shellac itself.

The resulting solution, containing the sodium resinate, is transferred to a larger receptacle and is subjected to treatment with a suitable acid, for example dilute sulfuric acid. The quantity of acid used depends upon the amount of caustic soda required to produce full solution of the shellac, and is usually very slightly more than enough to completely neutralize any traces of caustic soda remaining in the solution. The sulfuric acid is added slowly to the shellac solution and the product is allowed to stand until complete precipitation occurs. The water of the solution is drained off and the resultant precipitate is washed once or several times with pure water. The precipitate is then transferred to a clean receptacle and is cooked or heated to drive off the remaining traces of water in the solution. This is primarily a drying process the temperature not being carried sufficiently high to produce any change in the characteristics or composition of the solid matter. The solid material is then slowly cooled and is thinned with a suitable solvent, such as alcohol or the like. The resultant material should have a consistency about that of thick syrup or molasses so that it flows and can be applied with a brush, but nevertheless is in concentrated form.

If desired, the composition may be also provided with suitable solid body material, preferably inert and impervious to and unaffected by gasolene, oils or the like. Such material will improve the consistency of the mass and improve its spreading qualities, so that it is more readily applied with a brush. One suitable substance for this purpose is Venetian red or some other similar color material, which not only provides body and improves the spreading qualities, but also gives the material such a distinct color as to enable it to be applied more readily, the workman being enabled to see where the material has been applied.

The quantities of the various ingredients may be varied within reasonable limits and depend to some extent upon the character of shellac or gum and the particular effects desired. For example, one specimen batch of material was made according to my process as follows:—

The caustic soda solution consisted of ten (10) pounds of dry caustic soda dissolved in from ten (10) to fifteen (15) gallons of water, in which solution was dissolved thirty-six (36) pounds of orange shellac. Solution was promoted by heat and after complete solution the mass was allowed to cool for one-half hour and the waxy substance removed from the top of the solution.

The sulfuric acid solution was produced by slowly adding to about ten (10) gallons of water thirteen (13) pounds of oil of vitriol, 66° Baumé. This sulfuric acid solution was added to the resultant solution from the first caustic soda treatment. The mixture was allowed to stand thirty minutes to produce complete precipitation, whereupon the water was drawn off and the precipitate treated by heating gently for about one hour. The solid matter was then thinned with two gallons of 95% denatured alcohol.

It is found in practice that the quantity of dissolved and thinned shellac produced from several different batches of material, all of the same quantities, varies within limits. The quantity of body material or coloring matter to be added therefore depends on the amount of final dissolved product. Usually about two pounds of Venetian red are added to each gallon of resultant dissolved thinned shellac, although this depends considerably upon the treatment, as the heat volatilizes or expels a certain amount of shellac and considerable experience is necessary to prevent unnecessary loss.

The material produced by the method described to this point, either with or without coloring matter, can be used immediately and in various ways. For example, it forms a good coating material for rubber, rubber compositions or like packing materials. When rubber is used as a packing material for the joints of gasolene or like tanks, such joints and the rubber packing itself may be coated with the varnish or shellac product described. The varnish dries in about two days and when dry is not tacky or sticky. Nevertheless it is flexible and does not become brittle and therefore allows the packing material to be compressed or flexed without destroying the continuous protecting coating. The material also clings well to rubber or like materials and will not flake off. It is also absolutely impervious to and unaffected by gasolene, kerosene, oils, and the like.

The varnish is also suitable for use for coating conduits or pipes through which gasolene, oils and the like are conducted, or to protect the interior surfaces of containers therefor. It will cling to and forms a protecting coating for concrete, when used as a conduit or container, and also can be applied effectively to wood, metal and other surfaces. It also forms a very efficient coating for the inner surfaces of rubber tubing or hose and largely prevents deterioration thereof and therefore prolongs the hose life.

When the varnish is used as a protecting coating for rubber and rubber composition or similar packing materials, it may be applied in two ways. The structure, such as a tank, conduit or the like, may be assembled with the packing in place and the varnish subsequently applied to the exposed edges of the packing material, or to the surface of the tank or conduit. It is possible, however, to apply the varnish to the packing material in the form of a gasket or the like before said packing material is laid in place in the joint. For example, when the packing is in the form of a strip or a ring-like washer the varnish may be applied as a continuous coating over the entire surface of the gasket, or may be applied merely to the inner and outer edges of said gasket, to-wit, those edges which would be exposed on the inner and outer surfaces of the reservoir or conduit. This leaves the two opposite or upper and lower surfaces of the gasket uncoated, the rubber exposed on these surfaces protecting the leak-tight joint. Such packings or gaskets may form an article of manufacture and sale.

The varnish may also be modified for use as a cement, in which case it is provided with a solid body material of some inert filling substance, preferably inorganic, which is impervious to and unaffected by gasolene, oils and the like. Powdered silica and some silicates are suitable for this purpose, although I prefer to use finely divided asbestos fiber, or some other fibrous material. The quantity of this inert body material may vary, but approximately two and one-half (2½) pounds to each gallon of the varnish forms a satisfactory cement. When the substance is mixed with the varnish the fibers interlock as a firm body embedded in the varnish, and the dried material, utilized as a cement in a joint, renders the joint leak proof and impervious to gasolene, oils or the like. This cement, for example, can be applied to interlocking joints in metal receptacles, a thin coating sufficient to cover all exposed interlocking or concealed surfaces being sufficient. The inert filling material prevents squeezing the varnish entirely out of the joint when the parts are drawn together.

Other uses for the material will be apparent to those skilled in the art.

What I claim is:—

1. The process of forming a composition impervious to and unaffected by gasolene, oils and the like, consisting in dissolving shellac in an alkaline solution, producing a precipitate with an acid, dissolving the precipitate, and adding solid body material.

2. The process of forming a composition impervious to and unaffected by gasolene, oils and the like, consisting in dissolving shellac in a solution of caustic soda, producing a precipitate with sulfuric acid, dissolving the precipitate in alcohol and adding solid body material.

3. The process of forming a composition impervious to and unaffected by gasolene, oils and the like, consisting in dissolving shellac in caustic soda in the presence of heat, discarding the solid residue, producing a precipitate from the clear solution with sulfuric acid, washing and drying the precipitate, dissolving the precipitate in alcohol, and adding an inert inorganic body material.

In testimony whereof I affix my signature.

MORTIMER I. STRAUSS.